(12) United States Patent
Vigil

(10) Patent No.: US 7,954,783 B2
(45) Date of Patent: Jun. 7, 2011

(54) FOLDING BRACKET FOR LIGHT BAR

(76) Inventor: Aurelio A. Vigil, Miami, FL (US)

( * ) Notice: Subject to any disclaimer, the term of this patent is extended or adjusted under 35 U.S.C. 154(b) by 309 days.

(21) Appl. No.: 12/405,631

(22) Filed: Mar. 17, 2009

(65) Prior Publication Data
US 2010/0237211 A1 Sep. 23, 2010

(51) Int. Cl.
*F16M 13/00* (2006.01)
*E05B 73/00* (2006.01)
(52) U.S. Cl. ............................. 248/553; 248/552; 70/58
(58) Field of Classification Search .................. 248/551, 248/552, 553, 349.1, 680, 500, 918, 213.1; 70/57, 58, 57.1, 159, 163, 20, 21, 27, 31
See application file for complete search history.

(56) References Cited

U.S. PATENT DOCUMENTS

| | | | | |
|---|---|---|---|---|
| 3,724,798 A | * | 4/1973 | Lucasey | 248/418 |
| 4,170,334 A | * | 10/1979 | Villanueva | 248/553 |
| 4,696,449 A | * | 9/1987 | Woo et al. | 248/553 |
| 4,776,553 A | * | 10/1988 | Kobayashi | 248/558 |
| 6,012,739 A | * | 1/2000 | Weiss et al. | 280/814 |
| 6,053,016 A | * | 4/2000 | Young | 70/57 |
| 6,920,771 B1 | * | 7/2005 | Griffith | 70/225 |
| 2004/0118987 A1 | * | 6/2004 | Matko et al. | 248/282.1 |

* cited by examiner

*Primary Examiner* — Tan Le
(74) *Attorney, Agent, or Firm* — James A. Italia; Italia IP

(57) ABSTRACT

A two part bracket for mounting a light bar to an environmental surface. The bracket may comprise two mirror image platforms or members hinged to one another to move from an open condition to a closed or folded condition. Each platform may have a plurality of holes for passing fasteners to fix the platform to the light bar or to the environmental surface. In the closed conditioner, the bracket obstructs casual access to these fasteners. Each platform has an eye which aligns with the eye of the other platform when the bracket is in the closed condition, to receive the shackle of a padlock for example. Each platform includes pads which abut pads of the other to oppose collapse of the bracket due to weight loads.

3 Claims, 4 Drawing Sheets

FOLDING BRACKET FOR LIGHT BAR

FIELD OF THE INVENTION

The present invention relates to attachment brackets, and more particularly to a folding bracket for securing a light bar to a wheeled vehicle on which the light bar is to be mounted.

BACKGROUND OF THE INVENTION

Light bars are custom or semi-custom accessories which may be mounted on wheeled vehicles to provide supplementary lighting. The lighting may be for illumination, signaling, or both. One example of a popular application of light bars is for police cars.

A light bar is an assembly of lighting fixtures mounted on a common base, typically having a common translucent or transparent covering lens. The light bar typically spans the width of the vehicle to which it is mounted. A light bar may be bolted to its associated wheeled vehicle.

However, a light bar which is directly bolted to its vehicle suffers from vulnerability to theft or other unauthorized removal or tampering. A need exists to increase security of connection, and especially bolted connection, of a light bar to its associated wheeled vehicle.

SUMMARY OF THE INVENTION

The present invention addresses the above stated need by providing a bracket which may receive a security device such as a padlock such that bolted type connections are secured against access to those who would steal or tamper with the light bar. The bracket may comprise two complementary sections which pivot about a hinge and when closed, provide aligned eyes for receiving the shackle of a padlock or similar security device. When pivoted to spread apart in clamshell fashion, access to bolt heads, nuts, and like fasteners is enabled.

The novel bracket may comprise a plurality of holes in each of the mutually pivotal sections to provide choice as to fastener location.

The bracket may comprise complementing projections or pads formed on each one of the mutually pivotal sections, arranged to meet and abut when the bracket is in the closed position. The complementing pads support and accommodate weight or force loads which in the absence of abutting pads could distort the bracket and permit the bracket to collapse due to weight or force loads.

It is therefore an object of the invention to provide a bracket for mounting a light bar to a wheeled vehicle which covers fasteners used to mount the light bar on the vehicle.

Another object of the invention is to provide a bracket for mounting a light bar to a wheeled vehicle which comprises two mutually pivotal sections.

A further object of the invention is to provide a bracket for mounting a light bar to a wheeled vehicle which accepts a security device such as a padlock to provide security against unauthorized removal and tampering.

Yet another object of the invention is to provide a bracket for mounting a light bar to a wheeled vehicle which resists collapse and distortion.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
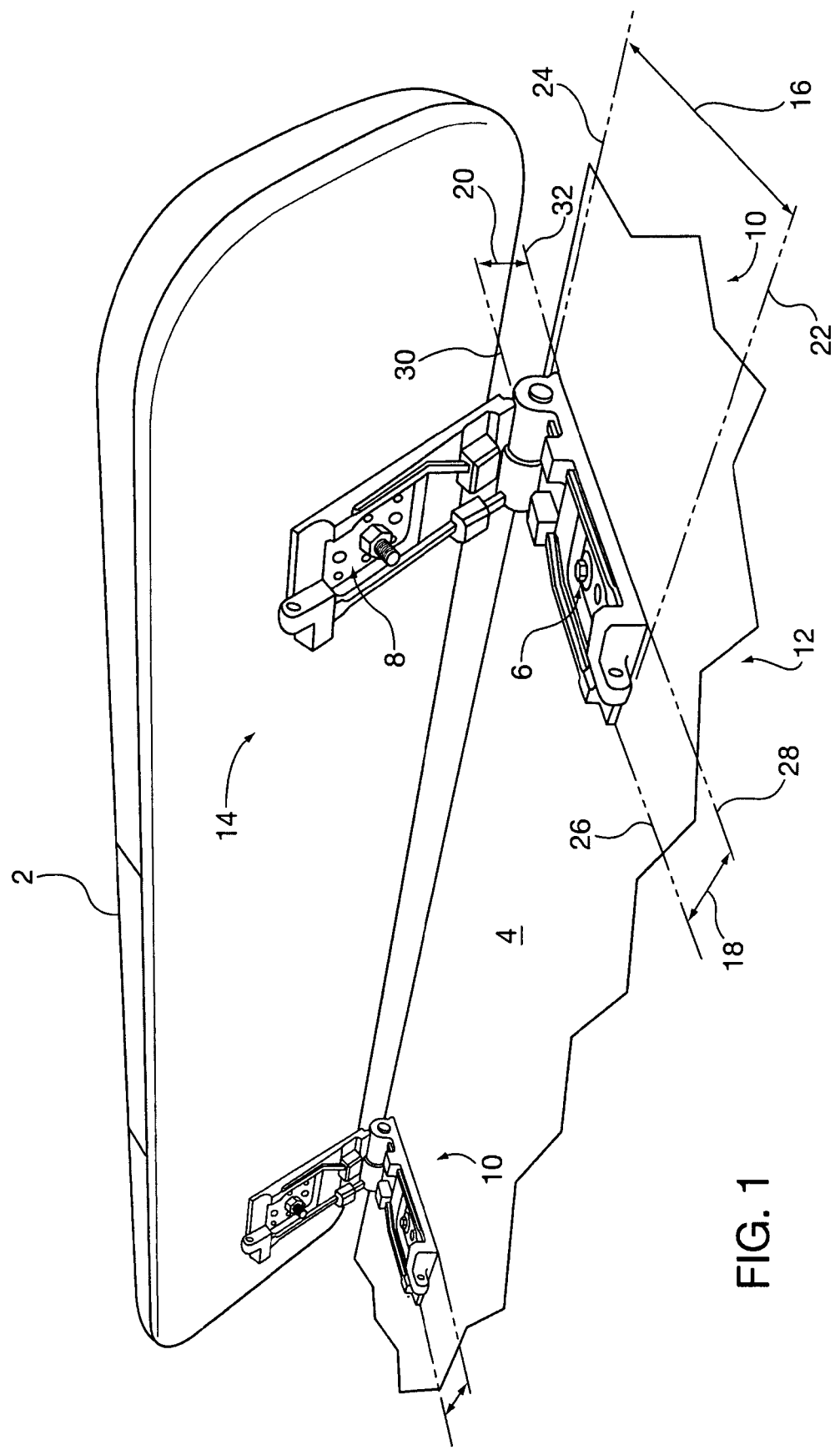
FIG. 1 is a perspective environmental view of two of the novel brackets, shown connecting a light bar to an environmental surface.

FIG. 1 of the drawings shows a light bar 2 mounted to an environmental surface such as the roof 4 of a tow truck (not shown in its entirety), using two brackets 10. The brackets 10, which may be identical to one another, are for mounting one object to an environmental surface, and not necessarily limited to mounting light bars such as the light bar 2 to a tow truck. Each one of the brackets 10 may comprise a first platform 12 and a second platform 14. The term platform as employed herein represents a member which serves as a generally rigid structural platform for supporting and connecting the various functional structures of the novel apparatus. Each platform 12 or 14 has length, represented as the arrow 16, width, represented as the arrow 18, and thickness, represented as the arrow 20. The length 16 will be understood to be the maximum length, and is that distance spanning the projection lines 22 and 24. Similarly, the width 18, which spans the projection lines 26 and 28, is the maximum width of the bracket 10, and the thickness 20, which spans the projection lines 30 and 32, is the maximum thickness. The thickness 20 is less in magnitude than the magnitude of either the length 16 or the width 18.

FIG. 1 shows a fastener 6 which fixes the platform 12 to the roof 4 of the tow truck, and a fastener 8 which fixes the platform 14 to the light bar 2. The fasteners 6, 8 are typically of the threaded and headed type, which may take the form for example of bolts, studs, nuts, screws, threaded eyes, and the like, which may be installed with supplementary devices such as lock washers, flat washers and others (none shown).

The platform 12 may be substantially a mirror image of the platform 14, although the platforms in the various embodiments which are possible may be different from one another if desired. Therefore, only platform 12 will be described in detail.

Figure 2:
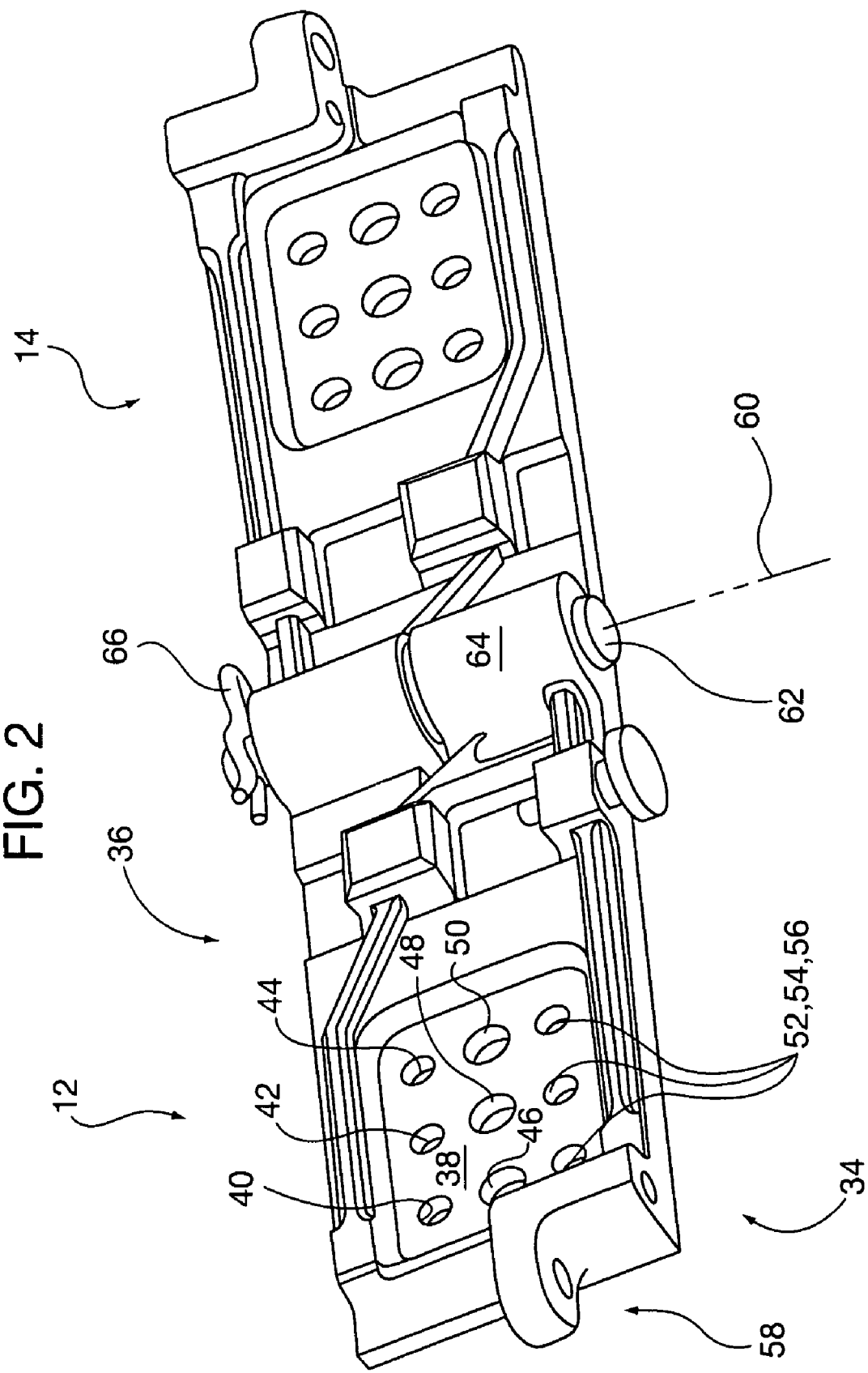
FIG. 2 is a perspective view of a novel bracket shown fully spread open.

In FIG. 2, the platform 12 is seen to comprise an exposed face 34 and an opposed concealable face 36, each of which is bounded at their common perimeter by the length and width dimensions 16 and 18. The exposed face 34 is that surface of the subject platform 12 which is exposed to view when the associated bracket 10 is folded into a closed condition, seen in FIG. 4. The concealable face 36 is exposed in the view of FIG. 2, but is concealed from both view and access in the closed condition of FIG. 4. The exposed face 34 and the concealed face 36 are formed on opposed sides of the platform 12.

The platform 12 may have a generally flat area 38 bearing a plurality of holes 40, 42, 44, 46, 48, 50, 52, 54, 56, which may as illustrated be arrayed as a matrix of nine holes laid out in rows of three holes and columns of three holes. It will be noted that the holes 46, 48, 50 are of diameter different from those of the holes 40, 42, 44, 52, 54, 56.

Each one of the holes 40, 42, 44, 46, 48, 50, 52, 54, 56, passes through the width of the constituent material of the platform 12, and communicates from the exposed face 34 to the concealed face 36. This is for the purpose of accepting a fastener such as the fasteners 6 or 8 for example in each one of the holes 40, 42, 44, 46, 48, 50, 52, 54, 56. At least one of the holes 40, 42, 44, 46, 48, 50, 52, 54, 56, and more if desired, may be used to accept a fastener.

An eye 58 is located at one end of the platform 12. The eye 58 will be understood to include both the opening and the surrounding structural material of the platform 12 which defines the opening. A corresponding eye is located at the same end (when the associated bracket such as the bracket 10 is in the folded condition shown in FIG. 4) of the other platform 14. In the folded condition shown in FIG. 4, the two eyes align so as to be able to accept the shackle 3 of a padlock 5. Installation of a padlock such as the padlock S immobilizes the bracket 10 in the folded condition of FIG. 4. It will be noted that in this folded condition, the conceable faces 36 of both the platforms 12 and 14 are neither visible nor accessible. Thus, in the folded condition, the fasteners such as the fasteners 6 and 8 are immune to casual removal that would for example release the light bar 2 for unauthorized removal, such as for theft.

It would be possible to provide the two eyes, such as the eye 58 and the corresponding eye, such that they are out of alignment. The platforms of the two eyes could nonetheless be united by for example by passing a flexible tether or a specially shaped rigid member (neither shown) through the two eyes.

The platform 14 will be understood to have length, width, thickness which is less in magnitude than the length and than the width, an exposed face bounded by the length and the width of the platform 14, an opposed concealable face bounded by the length and the width of the platform 14, at least one hole passing through the width of the platform 14 and communicating from the exposed face to the concealed face of the platform 14, for accepting a fastener, and an eye located at one end of the platform 14. These structural features of the platform 14 are functional counterparts of the similarly named components of the platform 12 regardless of whether the platform 14 is substantially a mirror image of the platform 12.

Again referring to FIG. 2, the platforms 12, 14 are mutually pivotable about an axis 60. A pin 62 may be rotatably supported within a trunnion bearing 64 of the platform 12. When both platforms 12 and 14 are assembled together about the pin 62, either or both of the platforms may pivot on the pin 62. The pin 62 may be of the type having a transverse throughbore (not visible in FIG. 2) through which a clip such as a cotter pin 66 may be placed to constrain the cotter pin 66 against loss for example by working its way along the axis 60 until it escapes entrapment within the trunnion bearing 64.

Figure 3:
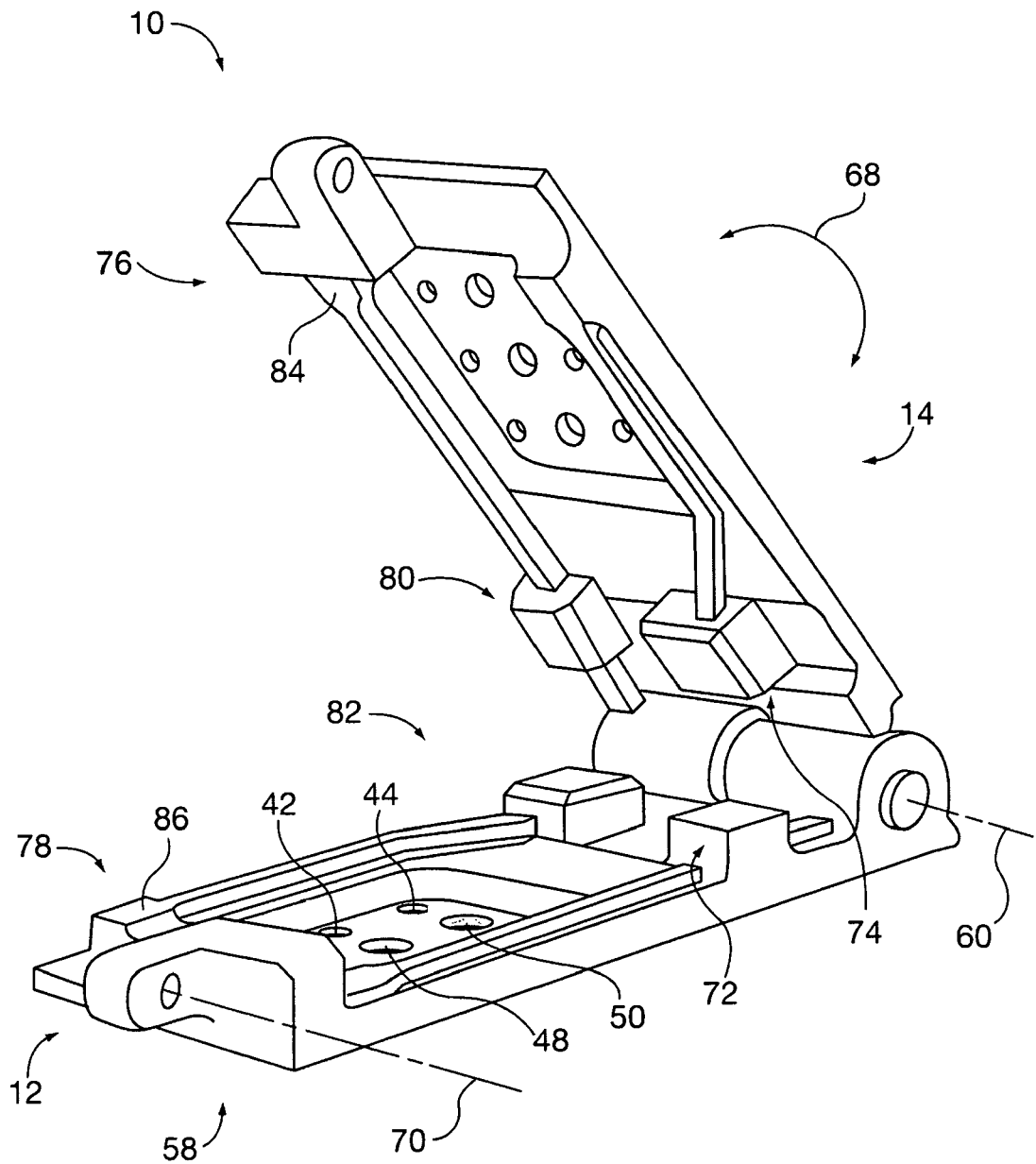
FIG. 3 is a perspective view of a novel bracket shown in approximately the same degree of opening as in FIG. 1.
Figure 4:
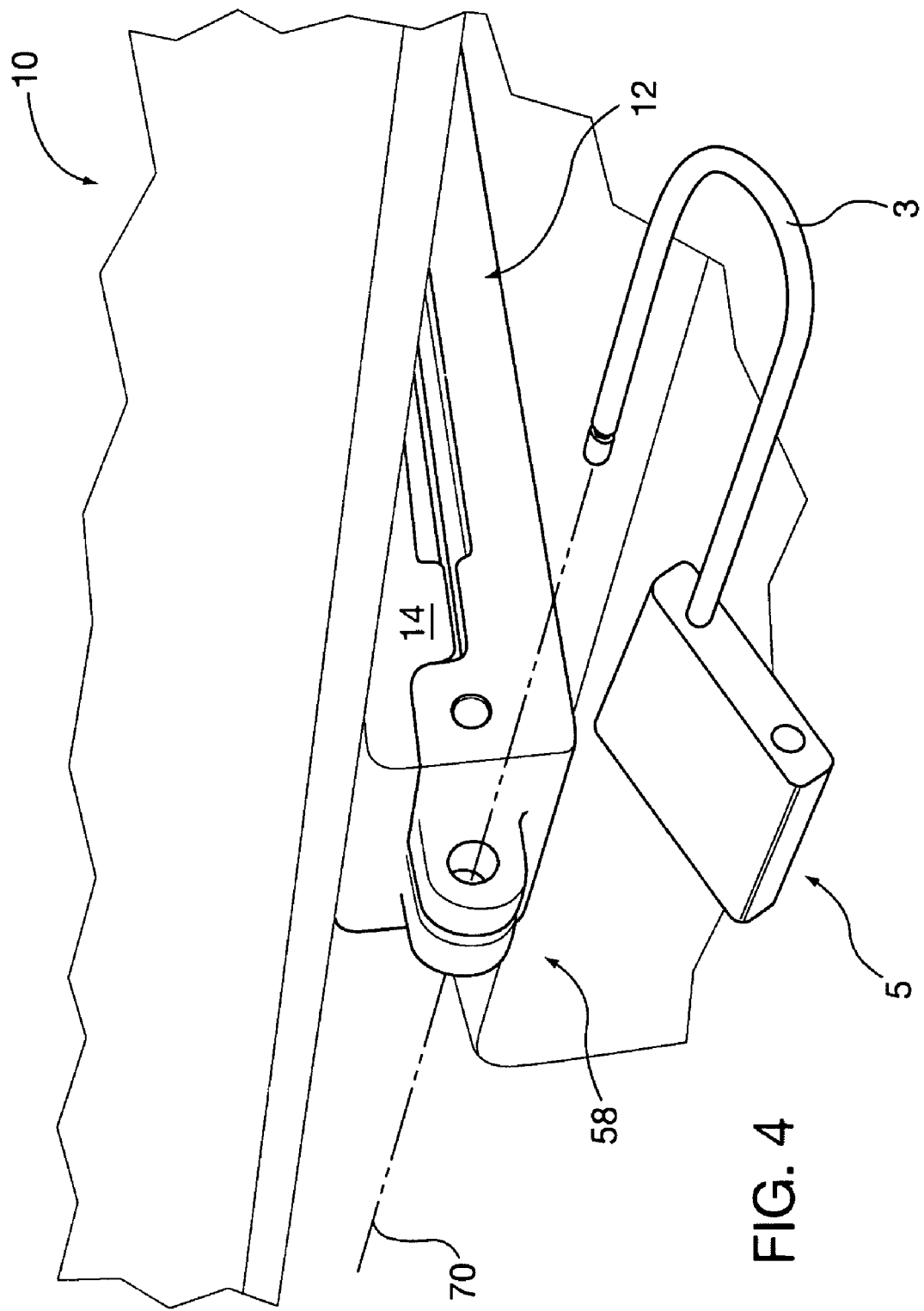
FIG. 4 is an environmental view of a novel bracket in the fully closed position, about to receive a padlock.

The pin 62 and the trunnion bearings of the platforms 12, 14 (such as the trunnion bearing 64) collectively form a hinge disposed to pivotally connect the platform 12 to the platform 14 such that the platform 14 may overlie the platform 12 (as seen in FIG. 4) in close abutment therewith. Close abutment establishes closed condition of the bracket 10 shown in FIG. 4. The platform 12 may swing away from the platform 14 (indicated as an arrow 68 in FIG. 3) to separate the concealable face 36 of the platform 12 from the corresponding concealable face of the platform 14, thereby establishing an open condition of the bracket 10. Open conditions of the bracket 10 are illustrated in FIGS. 1, 2, and 3.

Referring to FIGS. 3 and 4, the eye 58 of the platform 12 and the corresponding eye of the platform 14 may have a common eye axis 70 when the bracket 10 is in the closed condition of FIG. 4. As clearly seen in FIG. 3, the hinge (which may be represented here as the axis 60) is located on ends of the platforms 12, 14 which are opposite the ends bearing the common eye axis 70. It may further be noted from FIG. 3 that the common eye axis 70 may be parallel to the axis 60 of pivot of the hinge.

Continuing to refer to FIG. 3, the platform 12 and the platform 14 may have complementing weight support pads, such as the pads 72 and 74, 76 and 78, and 80 and 82. Each one of the pads 72, 74, 76, 78, 80, 82 may have a surface which abuts an opposed yet corresponding surface of a complementing pad when the bracket 10 is in the closed condition. As an example, the pad 76 may have a surface 84 which corresponds to and may come to abut a surface 86 of the pad 78. When the pads 72, 74, 76, 78, 80, 82 abut, compressive forces imposed on the exposed faces such as the exposed face 34 of the platform 12, which forces might distort and damage the bracket 10, are resisted by constituent material of the bracket 10 extending along the thickness of the platforms 12, 14.

The present invention is susceptible to modifications and variations which may be introduced thereto without departing from the inventive concepts. While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A bracket for mounting one object to an environmental surface, comprising:

a first platform having length, width, thickness which is less in magnitude than the length and than the width, an exposed face bounded by the length and the width, an opposed concealable face bounded by the length and the width, further comprising a first eye located at one end of the first platform, wherein the first platform has a plurality of holes passing through the width of the first platform and communicating from the exposed face to the concealed face, wherein the plurality of holes comprises a matrix of nine holes laid out in rows of three holes and columns of three holes;

a second platform having length, width, thickness which is less in magnitude than the length and than the width, an exposed face bounded by the length and the width, an opposed concealable face bounded by the length and the width, at least one hole passing through the width of the second platform and communicating from the exposed face to the concealed face, for accepting a fastener, further comprising a second eye located at one end of the first platform, whereby a tether may be passed through the first eye and the second eye to unite the first platform and the second platform, wherein the first eye and the second eye have a common eye axis when the bracket is in the closed condition, and the hinge is located on ends of the first platform and of the second platform which are opposite those of the common eye axis;

a hinge disposed to pivotally connect the first platform to the second platform such that the first platform may overlie the second platform in close abutment therewith to establish a closed condition of the bracket, and such that the first platform may swing away from the second platform to separate the concealable face of the first platform from the concealable face of the second platform, thereby establishing an open condition of the bracket; and means for locking the bracket in the closed condition.

2. A bracket for mounting one object to an environmental surface, comprising:

a first platform having length, width, thickness which is less in magnitude than the length and than the width, an exposed face bounded by the length and the width, an opposed concealable face bounded by the length and the width, further comprising a first eye located at one end of the first platform, wherein the first platform has a plurality of holes passing through the width of the first platform and communicating from the exposed face to the concealed face;

a second platform having length, width, thickness which is less in magnitude than the length and than the width, an exposed face bounded by the length and the width, an opposed concealable face bounded by the length and the width, at least one hole passing through the width of the second platform and communicating from the exposed face to the concealed face, for accepting a fastener, further comprising a second eye located at one end of the first platform, whereby a tether may be passed through the first eye and the second eye to unite the first platform and the second platform, wherein the second platform has a plurality of holes passing through the width of the second platform and communicating from the exposed face to the concealed face, wherein the plurality of holes of the first platform and the plurality of holes of the second platform each comprise a matrix of nine holes laid out in rows of three holes and columns of three holes;

wherein the first eye and the second eye have a common eye axis when the bracket is in the closed condition, and the hinge is located on ends of the first platform and of the second platform which are opposite those of the common eye axis;

a hinge disposed to pivotally connect the first platform to the second platform such that the first platform may overlie the second platform in close abutment therewith to establish a closed condition of the bracket, and such that the first platform may swing away from the second platform to separate the concealable face of the first platform from the concealable face of the second platform, thereby establishing an open condition of the bracket; and means for locking the bracket in the closed condition.

3. A bracket for mounting one object to an environmental surface, comprising:

a first platform having length, width, thickness which is less in magnitude than the length and than the width, an exposed face bounded by the length and the width, an opposed concealable face bounded by the length and the width, further comprising a first eye located at one end of the first platform, wherein the first platform has a plurality of holes passing through the width of the first platform and communicating from the exposed face to the concealed face;

a second platform having length, width, thickness which is less in magnitude than the length and than the width, an exposed face bounded by the length and the width, an opposed concealable face bounded by the length and the width, at least one hole passing through the width of the second platform and communicating from the exposed face to the concealed face, for accepting a fastener, further comprising a second eye located at one end of the first platform, whereby a tether may be passed through the first eye and the second eye to unite the first platform and the second platform, wherein the second platform has a plurality of holes passing through the width of the second platform and communicating from the exposed face to the concealed face, wherein the plurality of holes of the first platform and the plurality of holes of the second platform each includes holes of at least two different diameters;

wherein the first eye and the second eye have a common eye axis when the bracket is in the closed condition, and the hinge is located on ends of the first platform and of the second platform which are opposite those of the common eye axis;

a hinge disposed to pivotally connect the first platform to the second platform such that the first platform may overlie the second platform in close abutment therewith to establish a closed condition of the bracket, and such that the first platform may swing away from the second platform to separate the concealable face of the first platform from the concealable face of the second platform, thereby establishing an open condition of the bracket; and means for locking the bracket in the closed condition.

* * * * *